United States Patent [19]
Dvorchak et al.

[11] Patent Number: 5,854,301
[45] Date of Patent: Dec. 29, 1998

[54] NON-CRYSTALLINE, ETHYLENICALLY UNSATURATED POLYURETHANES

[76] Inventors: Michael J. Dvorchak; Lanny D. Venham; Scott A. Grace; Kevan E. Hudson, all of Bayer Corporation, 100 Bayer Rd., Pittsburgh, Pa. 15205-9741

[21] Appl. No.: 969,439

[22] Filed: Nov. 12, 1997

[51] Int. Cl.⁶ .................................................. C08G 18/67
[52] U.S. Cl. .............................. 522/90; 528/49; 528/75; 252/182.18; 526/301; 560/158
[58] Field of Search .................. 528/49, 75; 252/182.18; 522/90; 526/301; 560/158

[56] References Cited

U.S. PATENT DOCUMENTS

| | | | |
|---|---|---|---|
| 5,128,432 | 7/1992 | Meixner et al. | 528/49 |
| 5,136,009 | 8/1992 | Meixner et al. | 528/49 |
| 5,300,615 | 4/1994 | Meixner et al. | 528/49 |

FOREIGN PATENT DOCUMENTS 2142214   8/1995   Canada .

*Primary Examiner*—Rachel Gorr
*Attorney, Agent, or Firm*—Joseph C. Gil; Thomas W. Roy

[57] ABSTRACT

The present invention relates to ethylenically unsaturated polyurethanes which i) are substantially free from isocyanate groups,
ii) are liquid at 25° C.,
iii) have a total content of ethylenically unsaturated groups (calculated as C=C, MW 24) of 1 to 20% by weight and
iv) contain the reaction product of 4-isocyanatomethyl-1, 8-octamethylene diisocyanate (NTI) with a hydroxyalkyl (meth)acrylate.

The present invention also relates to a one-component coating composition containing these ethylenically unsaturated polyurethanes.

10 Claims, No Drawings

NON-CRYSTALLINE, ETHYLENICALLY UNSATURATED POLYURETHANES

BACKGROUND OF THE INVENTION

1. Field of the Invention

The present invention relates to ethylenically unsaturated polyurethanes, which are liquid at 25° C., and to the use of these polyurethanes as binders in one-component coating compositions.

2. Description of the Prior Art

Aliphatic polyurethanes that contain acryloyl groups are known and described in U.S. Pat. Nos. 5,128,432, 5,136,009 and 5,300,615 and in DE-A 4,404,616. U.S. Pat. No. 5,128,432 is directed to the preparation of liquid urethane acrylates from monomeric diisocyanates, such as HDI or IPDI. To avoid the formation of solid products, it is necessary to react the monomeric diisocyanate with a mixture of hydroxy acrylates, a mono-functional alcohol containing ester groups (such as trimethylolpropane (TMP) diacetate or diacrylate, which may optionally be alkoxylated) and a saturated, polyhydric alcohol such as TMP.

U.S. Pat. No. 5,136,009 is directed to the preparation of urethane acrylates from trimethyl-HDI by reacting this diisocyanate with a mixture of hydroxy acrylates and saturated, polyhydric alcohols such as TMP. U.S. Pat. No. 5,300,615 discloses that the urethane acrylates from U.S. Pat. No. 5,128,432 become turbid at less than 10° C. This problem is overcome by reacting a mixture of HDI and IPDI with a mixture of hydroxy acrylates, an alkoxylated mono-functional alcohol containing ester groups (such as TMP diacetate or diacrylate, which is alkoxylated), a branched, saturated, mono or dihydric alcohol and optionally a linear, saturated mono or dihydric alcohol.

DE-A 4,404,616 is directed to a coating composition for polycarbonate which contains the reaction product of a low viscosity polyisocyanate, such as a low viscosity HDI trimer, with a hydroxy acrylate. The composition also contains a bis-acrylate as a reactive diluent.

A disadvantage of the compositions described in the U.S. patents is that they are too viscous for use in solvent-free, one-component coating compositions. Attempts to lower the viscosity by directly reacting monomeric diisocyanates, such as HDI or IPDI, with hydroxy acrylates results in the formation of solid products. Attempts to use low viscosity polyisocyanates, such as the HDI trimer described in the German publication, also results in the formation of the solid products in the absence of the reactive diluent.

Accordingly, it is an object of the present invention to provide ethylenically unsaturated polyurethanes which do not suffer from the disadvantages of the prior art. It is an additional object of the present invention to provide ethylenically unsaturated polyurethanes that are suitable for use as binders for one-component coating compositions and have an acceptably low viscosity without the need for organic solvents and reactive diluents that are environmentally objectionable and regulated by the government.

These objects may be achieved with the ethylenically unsaturated polyurethanes according to the present invention, which are described in detail hereinafter.

SUMMARY OF THE INVENTION

The present invention relates to ethylenically unsaturated polyurethanes which i) are substantially free from isocyanate groups,
ii) are liquid at 25° C.,
iii) have a total content of ethylenically unsaturated groups (calculated as C=C, MW 24) of 1 to 20% by weight and
iv) contain the reaction product of 4-isocyanatomethyl-1, 8-octamethylene diisocyanate (NTI) with a hydroxyalkyl (meth)acrylate.

The present invention also relates to a one-component coating composition containing these ethylenically unsaturated polyurethanes.

DETAILED DESCRIPTION OF THE INVENTION

The ethylenically unsaturated polyurethanes are prepared by reacting 4-isocyanatomethyl-1,8-octamethylene diisocyanate (NTI) with a hydroxy-functional ethylenically unsaturated compound, preferably a hydroxyalkyl (meth)acrylate.

Suitable hydroxy-functional compounds containing (meth)acryloyl groups include hydroxyalkyl esters of acrylic or methacrylic acid, preferably those containing 1 to 8 carbons in the alkyl group, such as the 2-hydroxyethyl, 2-hydroxypropyl, and 2-, 3- or 4-hydroxybutyl esters of the acrylic or methacrylic acid.

While the hydroxyalkyl (meth)acrylates are preferably used to react with the NTI, minor amounts (i.e., up to 50 mole percent, preferably up to 30 mole percent and more preferably up to 20 mole percent) of other hydroxy-functional ethylenically unsaturated compounds may also be used.

Examples of these other hydroxy-functional, preferably monohydroxy-functional, ethylenically unsaturated compounds include $\beta,\gamma$-ethylenically unsaturated ether alcohols, preferably having 5 to 14 carbon atoms and containing at least one, preferably at least two, $\beta,\gamma$-ethylenically unsaturated ether groups, such as allyl alcohol, glycerol diallyl ether, trimethylol propane diallyl ether and pentaerythritol triallyl ether; hydroxyalkyl vinyl ethers such as 2-hydroxyethyl vinyl ether and 4-hydroxybutyl vinyl ether; reaction products of (meth)acrylic acids with monoepoxide compounds; addition products of 1 or more moles of $\epsilon$-caprolactone with 1 mole of the hydroxyalkyl (meth) acrylic esters; and alkoxylation products of these hydroxyalkyl (meth)acrylic esters, preferably with propylene or ethylene oxide, more preferably with propylene oxide.

The properties of the unsaturated polyurethanes can be modified by the choice of the unsaturated alcohol. For example, unsaturated polyurethanes reacted with hydroxyalkyl (meth)acrylates will result in harder coatings than polyisocyanates modified with addition products of $\epsilon$-caprolactone and hydroxyalkyl (meth)acrylic esters or with alkoxylation products of these hydroxyalkyl (meth) acrylic esters.

The ethylenically unsaturated polyurethanes according to the invention are substantially free from isocyanate groups and have a total content of ethylenically unsaturated groups of (calculated as C=C, MW 24) of 1 to 20%, preferably 3 to 15% and more preferably 5 to 15% by weight, The ethylenically unsaturated polyurethanes generally have a viscosity at 25° C. of less than 100,000 mPa.s, preferably less than 50,000 mPa.s. Preferably, these viscosities are obtained for the neat resins, i.e., in the absence of solvents or copolymerizable monomers.

Prior to their use in coating compositions the ethylenically unsaturated polyurethanes may be blended with known additives. Examples of these additives include wetting agents, flow control agents, antiskinning agents, antifoaming agents, matting agents, (such as silica, aluminum silicates and high-boiling waxes), viscosity regulators, pigments, dyes, UV absorbers and stabilizers against thermal and oxidative degradation.

Other additives include organic solvents and/or copolymerizable monomers, preferably copolymerizable monomers. Examples of suitable solvents include those known from polyurethane coating technology such as toluene, xylene, cyclohexane, butyl acetate, ethyl acetate, ethyl glycol acetate, methoxypropyl acetate (MPA), acetone, methyl ethyl ketone and mixtures thereof.

Copolymerizable monomers are selected from organic compounds which contain at least one copolymerizable olefinic double bond, preferably 2 or more double bonds, and preferably have a viscosity of not more than 1000, more preferably not more than 500 mPa.s at 23° C., such as di- and polyacrylates and di- and polymethacrylates of glycols having 2 to 6 carbon atoms and polyols having 3 to 4 hydroxyl groups and 3 to 6 carbon atoms.

Examples include ethylene glycol diacrylate, propane 1,3-diol diacrylate, butane 1,4-diol diacrylate, hexane 1,6-diol diacrylate, trimethylol-propane triacrylate, pentaerythritol tri- and tetraacrylate, and the corresponding methacrylates. Also suitable are di(meth)acrylates of polyether glycols of initiated with ethylene glycol, propane 1,3-diol, butane 1,4-diol; triacrylates of the reaction products of 1 mole of trimethylol-propane with 2.5 to 5 moles of ethylene oxide and/or propylene oxide; and tri- and tetraacrylates of the reaction products of 1 mole of pentaerythritol with 3 to 6 moles of ethylene oxide and/or propylene oxide. Other copolymerizable monomers include aromatic vinyl compounds such as styrene; vinyl alkyl ethers such as vinylbutyl ether or triethylene glycol divinyl ether; and allyl compounds such as triallylisocyanurate. Preferably, the copolymerizable monomers have functionalities of two or more.

The inert solvents and copolymerizable monomers are present in amounts of up to 200% by weight, preferably up to 100% by weight and more preferably up to 20% by weight, based on resin solids.

The coating compositions may be used to coat substrates of any kind, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

After the evaporation of any inert solvents used, the coatings may be crosslinked either by high-energy radiation, such as UV light, electron beams or γ rays, by heating to elevated temperatures in the presence of peroxides or azo compounds, or by curing with metal salts of siccative acids and optionally (hydro)peroxides at either elevated temperatures or at temperatures of room temperature or below.

When the coatings are crosslinked by UV irradiation, photoinitiators are added to the coating composition. Suitable photo-initiators are known and include those described in the book by J. Korsar entitled "Light-Sensitive Systems", J. Wiley & Sons, New York-London-Sydney, 1976, and in Houben-Weyl, Methoden der Organischen Chemie, Volume E 20, page 80 et seq, Georg Thieme Verlag, Stuttgart, 1987.

Particularly suitable photoinitiators include benzoin ethers such as benzoin isopropyl ether, benzil ketals such as benzil dimethylketal, and hydroxyalkyl phenones such as 1-phenyl-2-hydroxy-2-methylpropan-1-one. The photoinitiators may be added in amounts, depending upon the application, of 0.1 to 10%, preferably 0.1 to 5% by weight, based on the weight of the ethylenically unsaturated polyurethanes and any other copolymerizable monomers. The photoinitiators may be added individually or may be used as mixtures to obtain advantageous synergistic effects.

To cure the coating compositions at elevated temperatures, curing must be conducted in the presence of 0.1 to 10%, preferably 0.1 to 5% by weight, based on the weight of the ethylenically unsaturated polyurethanes, of initiators such as peroxides or azo compounds. Temperatures of 80° to 240° C., preferably 120° to 160° C., are needed to cure the coating compositions at elevated temperatures.

Suitable initiators include the known free-radical initiators, e.g., aliphatic azo compounds such as azodiisobutyronitrile, azo-bis-2-methyl-valeronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The coating compositions according to the invention may also be cured at room temperature in the presence of siccatives and optionally (hydro)peroxides, provided that a portion of the isocyanate groups have been reacted with β,γ-ethylenically unsaturated ether alcohols. Acryloyl groups cannot be cured by this method; however, once the allyl ether groups have been initiated, they can react with the (meth)acryloyl groups.

Suitable siccatives are known and include metal salts, preferably cobalt or vanadium salts, of acids such as linseed oil fatty acids, tall oil fatty acids and soybean oil fatty acids; resinic acids such as abietic acid and naphthenic acid; acetic acid; isooctanoic acid; and inorganic acids such as hydrochloric acid and sulfuric acid. Cobalt and vanadium compounds which are soluble in the coating compositions and act as siccatives are particularly suitable and include salts of the acids mentioned above and also commercial products such as "Vanadiumbeschleuniger VN-2 (Vanadium Accelerator VN-2)" marketed by Akzo. The siccatives are generally used in the form of organic solutions in quantities such that the metal content is 0.0005 to 1.0% by weight, preferably 0.001 to 0.5% by weight, based on the weight of the ethylenically unsaturated polyurethanes.

Examples of (hydro)peroxides include di-tert.-butyl peroxide, benzoyl peroxide, cyclohexanone peroxide, methyl ethyl ketone peroxide, acetyl acetone peroxide, dinonyl peroxide, bis-(4-tert.-butylcyclohexyl)-peroxydicarbonate, tert.-butyl hydroperoxide, cumene hydroperoxide, 2,5-dimethyl-hexane-2,5-hydroperoxide and diisopropyl benzene monohydroperoxide. The (hydro) peroxides are preferably used in quantities of 1 to 10% by weight, based on the weight of the ethylenically unsaturated polyurethanes.

When cured in the presence of cobalt and peroxides, the coating compositions generally cure over a period of 1 to 24 hours at 20° C. to form high-quality coatings. However, curing may also take place at lower temperatures (for example -5° C.) or more quickly at higher temperatures of up to 130° C.

The following examples and comparison examples are intended to illustrate the invention without limiting it in any way. All quantities in "parts" and "%" are by weight unless otherwise indicated.

EXAMPLES

Polyisocyanate 1—NTI 4-isocyanatomethyl-1,8-octamethylene diisocyanate, NCO content 50.2% and a viscosity ~10 mPa.s at 25° C.

Polyisocyanate 2—HDI 1,6-diisocyanatohexane, NCO content 50.0%, viscosity <20 mPa.s at 25° C.

Polyisocyanate 3—IPDI 1-isocyanato-3,3,5-trimethyl-5-isocyanatomethyl cyclohexane, NCO content 37.8%, viscosity <20 mPa.s at 25° C.

Polyisocyanate 4—HMDI 4,4'-bis-(isocyanato-cyclohexyl)-methane, NCO content 32.0%, viscosity 20 to 40 mPa.s at 25° C.

Polyisocyanate 5—Low viscosity polyisocyanate containing uretdione and isocyanurate groups and prepared from HDI A mixture containing 70 parts by weight of a uretdione group-containing polyisocyanate, i.e., dimerized 1,6-hexamethylene diisocyanate and 30 parts by weight of N,N',N"-tris-(6-isocyanatohexyl)-isocyanurate together with minor quantities of higher homologs of both products. In its 100% solvent free form, the polyisocyanate had an average viscosity of 195 mPa.s at 25° C. and an average NCO content of 20.0% (available from Bayer Corporation as Desmodur N 3400).

Polyisocyanate 6—Low viscosity polyisocyanate containing isocyanurate groups and prepared from HDI A low viscosity, isocyanurate group-containing polyisocyanates prepared from HDI and having an isocyanate content of 23.0% by titration, a free HDI content of less than 0.5% by weight and a viscosity of 1150 mPa.s at 25° C. (available from Bayer AG as Desmodur LS 2025).

Polyisocyanate 7—Polyisocyanate containing isocyanurate groups and prepared from HDI An isocyanurate group-containing polyisocyanate prepared from HDI and having an isocyanate content of 21.7%, a free HDI content of less than 0.5% and a viscosity of 3930 mPa.s at 20° C. (available from Bayer Corp. as Desmodur N 3300).

EXAMPLES 1–7

Preparation of ethylenically unsaturated polyurethanes

A round bottomed flask was charged with one equivalent of polyisocyanate and 0.1 %, based on the weight of the final product, of dibutyltin dilaurate. The flask was equipped with an overhead stirrer, nitrogen inlet, thermocouple, temperature controller, heating mantle and condenser. One equivalent of a hydroxyalkyl (meth)acrylate was then incrementally added to the stirred flask under a nitrogen blanket such that the temperature did not exceed 60° C. After the addition was complete the temperature was maintained at 60°C. for two hours until the isocyanate content was less than 0.5% by weight as determined by titration. The polyisocyanate and hydroxyalkyl (meth)acrylate as well as the viscosities and the calculated ethylenically unsaturated group contents (C=C, MW 24) of the resulting urethane acrylates are set forth in the following Table.

| | Viscosities @ 25° C. (mPa · s) Unsaturated End Group | | Unsaturated Group Content (%, C=C) Unsaturated End Group | |
|---|---|---|---|---|
| Polyisocyanate | HEMA | HEA | HEMA | HEA |
| 1 | 49,100 | 44,700 | 11.2 | 12.0 |
| 2 (Comp) | Solid | Solid | 11.2 | 12.0 |
| 3 (Comp) | — | >200,000 | — | 10.6 |
| 4 (Comp) | Solid | Solid | 9.2 | 9.7 |
| 5 (Comp) | 21,700 contained crystals | 21,800 contained crystals | 7.1 | 7.4 |
| 6 (Comp) | — | crystallized | — | 8.0 |
| 7 (Comp) | — | >200,000 | — | 7.7 |

The preceding table demonstrates that the unsaturated polyurethanes prepared from NTI and either hydroxyethyl acrylate or hydroxyethyl methacrylate is a low viscosity resin at 25° C. The fact that these resins are liquids is surprising when they are compared to unsaturated polyurethanes prepared from other monomeric isocyanates (Examples 2–4) or low viscosity adducts (Examples 5–7). The use of other types of polyisocyanates results in ethylenically unsaturated polyurethanes, which are either solid or contain solids, or have an unacceptably high viscosity.

EXAMPLES 8–9

Coatings prepared from unsaturated polyurethanes

Coatings were prepared from the unsaturated polyurethanes of Example 1 using the following formulation:

Formulation 1:
  80 parts of unsaturated polyurethane
  16 parts of trimethylolpropane triacrylate
  4 parts of 2-hydroxy-2-methyl-1-phenylpropan-1-one (Darocur 1173, available from Ciba-Geigy)

The formulations were drawn down onto glass panels at a wet film thickness of 3 mils and UV cured by passing under a 300 watt bulb at a height of 15 cm. Formulation 1 was cured in 1 pass at a speed of 2 m/min, which corresponded to ~1900 mJ/cm$^2$. The unsaturated polyurethane and pendulum hardness are set forth in the following table:

| Unsat. PU | Pendulum Hardness (sec) | | | | |
|---|---|---|---|---|---|
| Ex. from Ex. | Initial | 2 days | 4 days | 7 days | 14 days |
| 8  1/HEMA | 162 | 164 | 169 | 160 | 162 |
| 9  1/HEA | 179 | 189 | 190 | 200 | 181 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An ethylenically unsaturated polyurethane which
   i) is substantially free from isocyanate groups,
   ii) is liquid at 25°C.,
   iii) has a total content of ethylenically unsaturated groups (calculated as C=C, MW 24) of 1 to 20% by weight and
   iv) comprises the reaction product of 4-isocyanatomethyl-1,8-octamethylene diisocyanate (NTI) with a hydroxyalkyl (meth)acrylate.

2. The ethylenically unsaturated polyurethane of claim 1 wherein said hydroxyalkyl (meth)acrylate comprises a hydroxyalkyl ester of acrylic or methacrylic acid containing 1 to 8 carbons in the alkyl group.

3. The ethylenically unsaturated polyurethane of claim 1 wherein said hydroxyalkyl (meth)acrylate comprises 2-hydroxyethyl acrylate and/or 2-hydroxyethyl methacrylate.

4. The ethylenically unsaturated polyurethane of claim 1 which has a total content of ethylenically unsaturated groups (calculated as C=C, MW 24) of 3 to 15% by weight.

5. The ethylenically unsaturated polyurethane of claim 2 which has a total content of ethylenically unsaturated groups 3 to 15% by weight.

6. The ethylenically unsaturated polyurethane of claim 3 which has a total content of ethylenically unsaturated groups of 3 to 15% by weight.

7. The ethylenically unsaturated polyurethane of claim 1 which has a total content of ethylenically unsaturated groups 5 to 15% by weight.

8. The ethylenically unsaturated polyurethane of claim 2 which has a total content of ethylenically unsaturated groups of 5 to 15% by weight.

9. The ethylenically unsaturated polyurethane of claim 3 which has a total content of ethylenically unsaturated groups of 5 to 15% by weight.

10. A one-component coating composition which comprises the ethylenically unsaturated polyurethane of claim 1.

* * * * *